(12) United States Patent
Kinniard

(10) Patent No.: US 6,517,629 B2
(45) Date of Patent: Feb. 11, 2003

(54) METHODS FOR MAKING LOW VOLATILE TITANIUM DIOXIDE PIGMENTS

(75) Inventor: Stephen P. Kinniard, Ellicott City, MD (US)

(73) Assignee: Millennium Inorganic Chemicals, Inc., Hunt Valley, MD (US)

( * ) Notice: Subject to any disclaimer, the term of this patent is extended or adjusted under 35 U.S.C. 154(b) by 0 days.

(21) Appl. No.: 09/777,834

(22) Filed: Feb. 5, 2001

(65) Prior Publication Data

US 2002/0148389 A1 Oct. 17, 2002

(51) Int. Cl.$^7$ .......................... C09C 1/36; C01G 23/047
(52) U.S. Cl. ..................... 106/437; 106/442; 106/445; 106/447; 423/610; 423/611; 423/612
(58) Field of Search .................. 106/437, 442, 106/445, 447; 423/610, 611, 612

(56) References Cited

U.S. PATENT DOCUMENTS

| | | | |
|---|---|---|---|
| 3,501,262 A | 3/1970 | Arkless et al. ................ 23/21 |
| 3,505,091 A | 4/1970 | Santos ........................ 106/300 |
| 3,770,470 A | * 11/1973 | Swank ..................... 106/193 J |
| 3,849,149 A | * 11/1974 | Swift et al. ............. 106/288 B |
| 4,170,485 A | * 10/1979 | Blake et al. ................ 106/300 |
| 4,746,638 A | 5/1988 | Hori et al. ................... 501/127 |
| 4,877,818 A | 10/1989 | Emmons et al. ............. 522/26 |
| 5,049,595 A | 9/1991 | Dethlefs et al. ............ 523/351 |
| 5,332,433 A | 7/1994 | Story et al. ................. 106/442 |
| 5,631,310 A | 5/1997 | Tooley et al. ............... 523/212 |
| 5,824,146 A | 10/1998 | Ott ............................. 106/442 |
| 5,840,112 A | 11/1998 | Morris et al. ............... 106/442 |
| 5,908,498 A | * 6/1999 | Kauffman et al. .......... 106/437 |
| 5,993,533 A | * 11/1999 | Diebold et al. ............. 106/442 |

FOREIGN PATENT DOCUMENTS

| | | |
|---|---|---|
| EP | 0 583 063 | 2/1994 |
| EP | 0 870 731 A1 | 10/1998 |

OTHER PUBLICATIONS

Database WPI, "XP002205056," Derwent Publications, Ltd., Section CH, Week 198528, (1985). No month avail.
International Searching Authority, "PCT Notification of Transmittal of the International Search Report or Declaration,"(2002). Jul. 2002.
Braun, et al., "TiO2 pigment technology: a review," *Progress in Organic Coatings*, 20, 105–138 (1992). No month available.

* cited by examiner

*Primary Examiner*—Mark L. Bell
*Assistant Examiner*—Patricia L. Hailey
(74) *Attorney, Agent, or Firm*—David A. Kalow; Scott D. Locke; Kalow & Springut LLP

(57) ABSTRACT

The present invention provides a process for generating titanium dioxide pigments that have reduced moisture retention. By leaching oxidizer discharge and removing alumina containing compounds, one is able to generate a low volatile pigmentary bases. These low volatile pigmentary bases may be processed into finished low volatile pigments that may be combined with polymers to form polymer matrices. These pigments may be incorporated into polymer matrices at high temperatures without significant lacing.

25 Claims, No Drawings

METHODS FOR MAKING LOW VOLATILE TITANIUM DIOXIDE PIGMENTS

FIELD OF INVENTION

The present invention relates to the field of titanium dioxide pigments. More specifically, the present invention relates the production of low volatile titanium dioxide pigments.

BACKGROUND OF THE INVENTION

Titanium dioxide is widely used as a pigmenting agent in a vast number of applications. Due to its unique combination of high refractive index and chemical inertness it has become the white pigment of choice. One of the main industrial applications of $TiO_2$ is pigmenting of plastics articles.

Polymeric compounds (e.g., polyolefins) that are used to make plastics articles are required to be processed at high temperatures for a number of industrial processes. At elevated temperatures, inorganic compounds such as titania pigments that have been incorporated in the polymeric compounds can release volatile species such as water molecules, which can cause defects in polymers such as bubbles or holes. Holes formed in thin films may be referred to as "lacing," which is a phenomenon that limits the operating conditions of the film manufacturer. Consequently, film manufacturers often desire titanium dioxide pigments that have a reduced tendency to cause lacing.

Titanium dioxide is widely manufactured by either of two established processes, the sulfate process or the chloride process, both of which are well known to persons skilled in the art. The "sulfate" process is the older of the commercial processes. In the sulfate process, titanium bearing ores are dissolved in sulfuric acid, and the extracted titanium is purified by selective precipitation and washing, followed by calcination to produce raw crystalline $TiO_2$, of either the anatase or the rutile form.

In the "chloride" process, titanium bearing ores are reacted with $Cl_2$ gas and a reducing agent such as coke (the "chlorination" reaction) to produce titanium tetrachloride. The titanium tetrachloride is purified by distillation and reacted with oxygen to form $TiO_2$, usually of the rutile form. Aluminum chloride is usually reacted along with the $TiCl_4$ to enhance the properties of the base titanium dioxide such as improved resistance to chalking and to act as a rutilizing agent. Alumina levels can range from 0.1–10% by weight with respect to $TiO_2$, as suggested in U.S. Pat. Nos. 3,501,262 and 3,505,091, both of which are incorporated by reference. The alumina level is usually less than 10%, typically around 0.5–1.5%. However, alumina levels greater than 2% and preferably between 3% and 5% have been suggested, as in U.S. Pat. No. 5,824,146, which is incorporated by reference. The final product of the oxidation reaction is a substantially rutile particle that contains some aluminum in the rutile crystal and a surface that is enriched in aluminum species.

After the oxidation reaction, the raw base is collected on a filter to allow the liberated chlorine to be recycled to chlorination, and the collected base is mixed with water to form a slurry. This slurry can then be further processed, for example by milling in a media mill and/or treating with inorganic and/or organic compounds to enhance the properties of the pigment.

Historically, the raw base was "treated" after oxidation with an inorganic compound such as alumina to improve properties such as dispersion and material handling such as filtration and conveying. The term "treatment" refers to the precipitation or addition of a species, for example by addition of aluminum sulfate to the slurry followed by neutralization with caustic soda. This treatment occurs after oxidation, while the previously mentioned addition of aluminium chloride occurs prior to oxidation. Common inorganic treatments include alumina, phosphate, silica and zirconia.

In response to the demands of customers for grades of titania that can be processed in polymers at increasing temperatures and pigment loadings, manufacturers have been reducing the amount of inorganic surface treatment. The reason is that inorganic species are usually hydrated, either as part of the chemical structure or water adsorbed from the atmosphere onto the surface of the pigment. Upon heating, this water is driven off and is one of the key contributors to volatiles and subsequent defects such as lacing. Reducing the inorganic surface treatment reduces the total moisture content and reduces the volume of volatile species driven off of the pigment at elevated temperatures. The minimum moisture content on the base is obtained by adding no further inorganic compound after oxidation, that is by taking the raw oxidizer discharge, optionally wet milling, then neutralizing, washing, drying and micronizing the base.

An organic compound is commonly added to the pigmentary base in order to enhance further the dispersability and other properties such as rheology in the polymeric article. Typical organic compounds include polyols, alkanolamines, silanes, organophosphorous compounds, fatty acids and esters. A key benefit of organic compounds is that they usually further lower the moisture content of the pigment either by reacting with surface hydroxyl groups or by adsorbing to polar sites and blocking moisture pickup. The final product is usually milled in a device such as a fluid energy mill, referred to as a micronizer.

A limitation of the current technology is that the moisture content of the final micronized pigment is largely predetermined by the amount of moisture inherent to the oxidizer discharge and the ability of the organic to reduce further the moisture content. A further limitation is that reliance on organic additives to reduce the moisture content is heavily constrained by factors such as FDA approval for food contact applications. Not all organics that are effective at blocking moisture are approved for food contact applications. A base with a lower inherent moisture content will allow manufacture of products with equivalent moisture content using lower organic treatment levels and reduced manufacturing cost.

Thus, there presently exists a need for a titanium dioxide pigment with a reduced volatile content to allow higher processing temperatures and increased $TiO_2$ loadings in plastics applications without significant lacing. A benefit of the present invention is that it allows the manufacture of pigments that have a much lower level of volatiles associated with them than can be obtained with the current practice.

SUMMARY OF THE INVENTION

The present invention provides a novel method for making a titanium dioxide pigmentary base of reduced moisture content by dissolving readily soluble alumina species present in oxidizer discharge and removing the soluble species by filtration or some similar process such as settling and decantation. Such a base exhibits substantially lower moisture content when the base is dried and may be used to prepare low volatile pigments that are used to produce polymeric matrices in high temperature applications such as extrusion coating that have minimal or no lacing defects.

In one embodiment, the present invention provides a method for producing a low volatile pigmentary base that may be further processed to form a finished titanium dioxide pigment, comprising:

a. oxidizing titanium tetrachloride and aluminum chloride to form an oxidizer discharge comprising co-oxidized alumina and titanium dioxide; and b. separating and removing a portion of the co-oxidized alumina, said separating and removing causing a reduction in the ratio of co-oxidized alumina to titanium dioxide, causing a titanium dioxide slurry to be formed, said titanium dioxide slurry comprising said low volatile pigmentary base.

In another embodiment, the present invention provides a method for producing a low volatile pigment comprising:

a. obtaining an oxidizer discharge, the oxidizer discharge comprising titanium dioxide and co-oxidized alumina;

b. combining the oxidizer discharge with a solvent;

c. dissolving a portion of the co-oxidized alumina to form dissolved alumina;

d. removing the dissolved alumina from the titanium dioxide, causing a titanium dioxide slurry to be formed, said titanium dioxide slurry comprising a low volatile pigmentary base; and e. drying and micronizing the low volatile pigmentary base to form a low volatile pigment.

In another embodiment, a low volatile pigment may be produced by a method comprising:

a. oxidizing titanium tetrachloride and aluminum chloride to form an oxidizer discharge comprising alumina containing compounds;

b. removing an amount of said alumina containing compounds greater than 0.05% by weight with respect to the weight of the titanium dioxide to form a low volatile pigmentary base; and c. drying and micronizing the low volatile pigmentary base to form a low volatile pigment.

In another embodiment, a low volatile pigment may be produced by a method comprising:

a. oxidizing titanium tetrachloride and aluminum chloride to form an oxidizer discharge, said oxidizer discharge comprising co-oxidized alumina and titanium dioxide;

b. combining the oxidizer discharge with a solvent;

c. dissolving at least 0.05% of the co-oxidized alumina by weight with respect to the titanium dioxide to form dissolved alumina;

d. removing the dissolved alumina from the titanium dioxide, causing a titanium dioxide slurry to be formed, said titanium dioxide slurry comprising titanium dioxide and residual solvent;

e. neutralizing and washing said titanium dioxide slurry, removing the residual solvent;

f. drying said titanium dioxide slurry after said neutralizing and washing, causing a dried pigment to be formed;

g. micronizing said dried pigment to form said low volatile pigment; and h. at a point in the method after having formed the titanium dioxide slurry of step (d) and prior to completion of the micronizing of step (g), adding at least one organic compound.

The low volatile pigmentary bases of the present invention will preferably be surface treated with one or more organic compounds, such as silanes, siloxanes, polysiloxanes, polyols and organophosphorous compounds in order to lower further the volatility of the pigments. The low volatile pigmentary bases that are produced according to the present invention may also be treated with these other substances for reasons other than to reduce lacing, including to increase dispersibility, opacity or other characteristics.

The present invention also provides a method for producing polymer matrices that are resistant to lacing.

For a better understanding of the present invention, together with other and further embodiments, reference is made to the following description taken in conjunction with the examples, the scope of which is set forth in the appended claims.

DETAILED DESCRIPTION

According to the present invention, titanium dioxide pigments manufactured by the chloride process are subject to a process that reduces the amount of alumina containing compounds relative to the titanium dioxide, which in turn reduces the amount of volatiles associated with the titanium dioxide. The present invention thus provides methods for producing low volatile pigments.

The phrase "low volatile pigment" refers to a pigment that has a relatively low level of volatiles, such as water associated with it. Because these types of pigments retain a reduced amount of volatiles, they may be particularly useful in high temperature applications in which lacing is a concern.

The present invention also provides a method for producing low volatile pigmentary bases. The phrase "low volatile pigmentary base" refers to a titanium dioxide pigmentary base that has been processed in some manner to reduce the level of volatiles associated with it but that will be further processed or finished prior to its use as a pigment. One may view a low volatile pigment as containing a low volatile pigmentary base that has in some way been further processed or finished so as to provide it with the desired characteristics for a particular application. Such further processing or finishing may, by way of example, include one or more of the steps: neutralizing, washing, drying, wet milling, micronizing and surface treating with an organic compound.

The present disclosure is not intended to be a treatise on either pigments or the production of polymer matrices. Readers are referred to appropriate available texts and other materials in the field for additional and detailed information on any aspect of practicing this invention.

The chloride process requires the oxidation of titanium tetrachloride to form titanium dioxide. During the chloride process, it is preferable to react alumina containing compounds preferably aluminium chloride with titanium tetrachloride prior to oxidation of the titanium tetrachloride. The phrase "alumina containing compounds" refers to any compound that contains alumina and is not limited to any one particular type of molecule, molecules, substance or substances or the compounds formed at any particular stage or stage of the processes of the present invention. Both the titanium tetrachloride and the alumina containing compounds that are added to the titanium tetrachloride will be oxidized. The methods for oxidizing titanium tetrachloride and alumina containing compounds in the chloride process are well-known to persons skilled in the art.

The products of the oxidation of titanium tetrachloride and the alumina containing compounds are referred to as "oxidizer discharge." The oxidizer discharge comprises titanium dioxide and co-oxidized alumina. The titanium dioxide may be of either the anatase or rutile form. The phrase "co-oxidized alumina" refers to the oxidized alumina containing compounds formed as part of the oxidation step. Co-oxidized alumina is meant to refer not only to $Al_2O_3$ (i.e. aluminum oxide), but also is used in a more general context that covers any alumina containing compound including but not limited to hydrated alumina containing compounds that have been recovered from the oxidizer during the chloride process. Oxidizer discharge may also contain small amounts of other substances such as potassium chloride.

During the chloride process, oxidizer discharge is preferably slurried with water to ease material handling issues such as adsorbed chlorine. The substance formed by the addition of water to the oxidizer discharge is referred to as an "oxidizer discharge slurry" and includes any substance comprising oxidizer discharge and water. The amount of water used to form the oxidizer discharge slurry is well known to persons skilled in the art. The oxidizer discharge slurry then obtained can optionally be wet milled in a device such as a sand mill or horizontal media mill, although it is preferable to use oxidizer discharge that has not been wet milled. Addition of a substance to react with residual chlorine and to convert it into a safer product is also a preferred step to reduce the risk of chlorine escaping from the oxidizer discharge slurry. An example of a substance used to react with the residual chlorine is hydrogen peroxide, which converts the chlorine to HCl.

The oxidizer discharge slurry is then processed to reduce the amount of alumina containing compounds, by combining the slurry with a solvent. The term "solvent" refers to any substance in which the co-oxidized alumina compounds are readily soluble. The solvents that can be used may be either acidic or basic in nature, as aluminum is soluble in either acidic or alkaline conditions. Preferably, the solvent is an acid such as hydrochloric acid, sulfuric acid or nitric acid, or a base such as sodium hydroxide or potassium hydroxide.

The use of the solvent to remove the soluble alumina may be referred to as "leaching" and the low volatile pigmentary base that is produced according to the present invention may be referred to as a "leached base" or "leached pigmentary base." After dissolving or leaching the soluble alumina, one must remove or separate this dissolved or leached alumina from the titanium dioxide.

The solvent and the oxidizer discharge slurry may be physically combined by any means that are now known or come to be known to persons skilled in the art. Preferably, the solvent and the oxidizer discharge slurry may be combined by pouring or pumping the solvent into the oxidizer discharge and stirring, agitating or otherwise mixing the solvent and the oxidizer discharge. By stirring, agitating or otherwise mixing the solvent and the oxidizer discharge, the solvent is able to dissolve a portion of co-oxidized alumina, the soluble alumina. The phrase "soluble alumina" refers to alumina containing compounds that are soluble in a solvent. The soluble alumina that is dissolved may be referred to as the "dissolved alumina." The phrase "portion of co-oxidized alumina" is used to clarify that in practice one will typically not be able to dissolve all of the co-oxidized alumina.

Upon dissolving the readily soluble aluminum species, the soluble compounds are separated from the other constituents of the slurry by any suitable means, including settling and decanting, centrifuging or filtration to leave a titanium dioxide slurry. In a preferred process, the solvent is sulfuric acid and the separation is by means of a filter. Any suitable filter can be used, including vacuum filtration or pressure filtration. According to the present invention, although one may try to remove all of the dissolved alumina, this will often not be practical and some fraction of this dissolved alumina may remain associated with the titanium dioxide even after processing according to the present invention.

When separation is accomplished by filtration, washing to displace liquid containing soluble aluminum compounds from the filter cake is optional but preferred. This washing may be referred to as a "first wash." The first wash may be accomplished by any substance that is effective for removing the liquid that contains the soluble alumina compounds, for example, demineralized water. The use of the phrase "first wash" is not intended to imply that one may only wash the filtered substance one time. It may be desirable to repeat this washing in order to maximize its efficiency.

The quantity of alumina containing compound that is removed is preferably greater than about 0.05% expressed as $Al_2O_3$ by weight with respect to $TiO_2$. The minimum quantity of acid or base required is the stoichiometric equivalent necessary to react with this quantity of alumina. In the case of sulfuric acid, this equates to 1.44 grams $H_2SO_4$ per kilogram of base titanium dioxide, which equates to 0.144% $H_2SO_4$ by weight with respect to $TiO_2$. The maximum quantity of acid or base is effectively unlimited. However, although a composition consisting of oxidizer discharge in concentrated acid or alkali is feasible, due to cost and handling difficulties it is not preferable. The practical limitation of the quantity of acid or alkali used is likely to be based on economic factors, as well as the quantity of readily soluble alumina. Typically, a level of 0.1–10% by weight with respect to $TiO_2$ would be sufficient.

Once the soluble alumina is removed, one is left with a titanium dioxide slurry. The phrase "titanium dioxide slurry" refers to the substance that remains after the soluble alumina has been removed from the oxidizer discharge slurry. The titanium dioxide slurry contains titanium dioxide and an amount of co-oxidized alumina less than was contained in the oxidizer discharge. The titanium dioxide that remains in the titanium dioxide slurry and that has been processed according to the present invention is referred to as a "low volatile pigmentary base" or a "leached base."

By having a reduced level of alumina relative to the titanium dioxide, the low volatile pigmentary base is suitable for various finishing or processing steps that render it useable as a low volatile pigment. For example, one will likely want to remove undesirable residual substances from the titanium dioxide slurry. These substances may include salts, excess solvent and water.

The low volatile pigmentary base may be finished or processed by neutralization, washing, drying, wet milling, micronizing and/or treating with an organic compound to form a low volatile pigment that may be incorporated into a polymer. Although, not all of these finishing steps are necessary for all applications, typically one or more will be selected. The methods for these processing or finishing steps are all well known to persons skilled in the art.

After the soluble alumina is removed, the titanium dioxide slurry is preferably neutralized. Neutralization will typically be used after the aforementioned first wash. Neutralization facilitates the removal of undesirable residual ions, which are more easily removed at a neutral pH. The substance used to neutralize will in part depend on the substance that was used to dissolve the alumina species. For example, if an acid such as sulfuric acid has been used to dissolve the alumina species, preferably one will use a base such as sodium hydroxide or soda ash to neutralize the residual sulfate ions.

The titanium dioxide slurry is also preferably washed. More preferably, the titanium dioxide slurry will be washed after it is neutralized. This washing step is distinct from the aforementioned "first wash." This washing, which occurs after neutralization, may be referred to as the "second wash." The second wash may be used to remove residual ions and residual solvent. In part, the substance used for the second wash will depend on the substance that was used in order to dissolve the alumina species. Preferably, demineralized water is used. Neutralization and the second wash may be repeated in order to maximize the efficiency of the removal of undesireable substances.

The titanium dioxide slurry is also preferably dried. More preferably, the drying stage follows the neutralization and second wash. Drying may be accomplished by exposing the titanium dioxide slurry, or more preferably, the low volatile pigmentary base that has been washed and neutralized to heat. The titanium dioxide slurry produced according to the present invention will typically have a significant amount of water. The drying stage serves the purpose of removing water prior to combining the pigment with a polymer. The product of the drying process may be referred to as a "dried pigment."

Preferably, one will also subject the low volatile pigmentary base to a milling step such as wet milling or micronizing in a fluid energy mill. Milling is used to break up agglomerates or aggregates. As discussed above, wet milling may be done prior to removal of the soluble alumina. Preferably, micronizing will be conducted on the dried pigment.

The low volatile pigmentary base will preferably also be surface treated with one or more organic compounds during one or more of the finishing steps that are used to make the low volatile pigment from the leached pigment. Examples of organic compounds that may be added to surface treat the low volatile pigmentary base include polyols, alkanolamines, silanes, organophosphorous compounds, fatty acids and esters. The methods for treating pigmentary bases with organic compounds are well known to persons skilled in the art.

As discussed above, according to the present invention, the titanium dioxide slurry may be neutralized, washed, dried, wet milled and/or micronized, prior to incorporation into a polymer matrix. The organic compound may be added at any time after the titanium dioxide slurry is formed and prior to the incorporation into the polymer matrix. The optimal time of when to add the organic compound will depend on the desired product and the processing conditions. For example, the organic compound may be added as a wet treatment in the titanium dioxide slurry, before or after drying, or after any milling step such as wet milling or micronizing.

When more than one organic surface treatment is added, the addition may occur at the same or different steps. Because multiple organics can be added, and multiple types of organic compounds may be added, an array of different treatments of organics may be applied to leached bases made according to the present invention. For example, the same organic compound could be added at two or more different points in the finishing process, and different organic compounds could be added at the same point or at different points in the finishing process. When more than one organic compound is used to form a surface treatment, the first organic compound to be used as a surface treatment for the low volatile pigmentary base may referred to as a "first organic compound." Similarly, the second organic compound to be used as a surface treatment for the low volatile pigmentary base may be referred to as the "second organic compound." Each additional organic compound that is used to create a surface treatment may be similarly named. By way of example, a first organic compound may be added prior to a washing step and a second organic compound may be added at the micronizer.

In theory, one could also treat the low volatile pigmentary base with inorganic compounds. However, the benefit of any inorganic treatments must be weighed against the potential of these inorganic compounds to increase the amount of volatile associated with the pigment. Examples of inorganic compounds that may be used to treat the low volatile pigmentary base include phosphates and silica. The methods for adding these compounds are well known to persons skilled in the art.

The aforementioned processing or finishing steps that one uses after one removes the soluble alumina are exemplary and should not be construed to limit the finishing steps that may be applied to the low volatile pigmentary base to any type of treatment or unit operation.

Once a desired low volatile pigment is formed it may be combined into a polymer to form a polymer matrix. The phrase "polymer matrix" refers to the substance containing the low volatile pigment and a polymer. The methods for combining the low volatile pigment with a polymer are well known to persons skilled in the art. Suitable polymers include, but are not limited to polyolefins such as polyethylene and polypropylene. The low volatile pigments of the present invention will typically be combined in polymers in an amount from about 1% up to about 80% by weight based on the weight of the polymer matrix. More typically, the polymer matrix will contain from about 10% to about 20% low volatile pigment based on the weight of the polymer matrix.

The volatile pigments produced according to the present invention are also suitable for use in masterbatch applications. The methods for using pigments in masterbatch applications are well known to persons skilled in the art.

EXAMPLES

The present invention is illustrated by the following examples. These are merely illustrative and should not be construed as limiting the scope of the invention.

Test Methods

Below are described the test methods used in the examples to evaluate lacing and moisture analysis.

Lacing

Titanium dioxide is compounded into a 50% masterbatch by mixing 125 grams $TiO_2$ and 125 grams Dow NA 722 Low Density Polyethylene Resin in a Rheocord 9000 Torque Rheometer attached with a Rheomix 3000 mixer with banbury rotors. The concentrate obtained is then pelletized on a 24:1 L/D Killion extruder and the pellets conditioned for 48 hours in a constant humidity cabinet at 50% relative humidity and 22° C.

The lacing test is run on the same Killion equipped with a slot die for fabricating cast films. A Killion 10 inch polished chrome chill roll was used to haul off the films using a temperature profile (zone 1 to die) of 300, 350, 415, 515, 625° F. The 50% concentrate is mixed with virgin low density polyethylene such that a 20% $TiO_2$ concentration film will be produced and fed into the Killion extruder. Lacing results were ranked by visual observations. A 1.0–3.0 rating system was used and increments of 0.1 were used to give an indication of relative performance between the samples.

Rating Film Appearance
1.0—no lace, a clean film
2.0—onset lacing, no obvious holes
3.0—lace, holes in film Moisture Analysis A sample of pigment to be tested is first conditioned for 24 hours in a constant condition cabinet at 23° C. and 50% relative humidity. After conditioning, 0.25 grams of sample is analyzed using a Mitsubishi Moisture Meter, Model number CA-06 attached with a vaporizer, model number VA-06. The moisture is measured using coulometric Carl Fischer titration at a furnace temperature of 300° C.

Example 1

1.27 kilogram of titanium dioxide that was collected after oxidation was made into a slurry of approximately 300 grams per liter concentration. The slurry was heated to 75° C. and a quantity of 98% sulfuric acid was added to dissolve any readily soluble alumina. After 30 minutes, the acidified slurries were filtered using vacuum filtration and washed with 2 liters of demineralized water to displace the soluble aluminum from the filter cake. The washed filter cake was then reslurried with a further 3 liters of demineralized water, heated to 75° C. and sodium hydroxide solution (200 gpl NaOH) added to raise the pH to 8.0. The neutralized slurry was then filtered and washed using 3 liters of demineralized water. Five separate batches were prepared and leached using 2, 4, 6, 8 and 10% of concentrated sulfuric acid by weight with respect to the $TiO_2$. The samples were dried and analyzed for alumina level by X-ray fluorescence. The results are tabled below in Table I.

TABLE I

| $H_2SO_4$ w/w on $TiO_2$ | % $Al_2O_3$ |
| --- | --- |
| 0 (Original base) | 0.80 |
| 2 | 0.50 |
| 4 | 0.47 |
| 6 | 0.47 |
| 8 | 0.47 |
| 10 | 0.47 |

It is seen that a sulfuric acid addition level greater than 4% did not have any effect upon the final alumina level. In all cases a significant reduction in alumina level was obtained after leaching and washing.

Example 2

A number of samples of oxidizer discharge were collected. Neutralization and leaching was performed at 75° C. with a slurry of approximately 300 grams per liter $TiO_2$ concentration.

1. Neutralization—The slurry was neutralized to a pH of 8 using NaOH solution and filter washed followed by drying at 110° C.

2. Leaching—The slurry had 4% $H_2SO_4$ by weight based on the weight of $TiO_2$ added as 98% strength sulfuric acid prior to heating. Upon reaching 75° C., the slurry was filter washed and repulped. The repulped base was heated to 75° C. and neutralized with NaOH solution to a pH of 8, followed by filter washing to remove the residual sulfate ions. The base was then dried at 110° C.

The alumina level and moisture content (measured at 300° C. using Mitsubishi analyzer) are tabled below in Table II.

TABLE II

| Sample | Alumina Level % | | Moisture Level % | |
| --- | --- | --- | --- | --- |
| No. | Neutralized | Leached | Neutralized | Leached |
| 1 | 1.11 | 0.75 | 0.321 | 0.258 |
| 2 | 1.11 | 0.74 | 0.371 | 0.307 |
| 3 | 0.80 | 0.47 | 0.368 | 0.275 |

It is clear that removal of soluble alumina has significantly reduced the base moisture content.

Example 3

Oxidizer discharge was leached with 4% $H_2SO_4$ by weight based on the weight of the $TiO_2$ and washed to remove soluble alumina. The washed base was then repulped with water and NaOH solution added to neutralize the slurry that was then washed to remove residual sulfate ions. The base was then dried. A second quantity of base was prepared by simply neutralizing and washing oxidizer discharge, followed by drying. Both the leached and the non-leached bases were then mixed with 0.7% by weight of Sylvacote K (Arizona Chemicals Corp) and micronized.

The micronized samples were prepared into 50% concentration masterbatches for the lacing test. Along with a standard dilution to 20% $TiO_2$ for the lacing test, further dilutions were made to achieve 25, 30, 35 and 40% $TiO_2$ in the film. The lacing results are tabled below in Table III.

TABLE III

| $TiO_2$ Concentration | Non-Leached Base | Leached Base |
| --- | --- | --- |
| 20% | 1.0 | 1.0 |
| 25% | 1.5 | 1.3 |
| 30% | 2.1 | 1.5 |
| 35% | 2.3 | 1.6 |
| 40% | 2.5 | 2.0 |

It is seen that the leached base is more resistant to the lacing and can withstand higher $TiO_2$ loadings for a given level of lacing.

Example 4

Oxidizer discharge was leached and washed as in example 2 and dried at 110° C. A sample of neutralized, non-leached base was also prepared and dried. To these base pigments was added n-octanoic acid at varying levels, and the organic dosed pigment tumble mixed and micronized. The final micronized pigments were tested for moisture content and also tested for lacing. The results are shown below in Table IV.

TABLE IV

| % Octanoic | Non-Leached Base | | Leached Base | |
| --- | --- | --- | --- | --- |
| Acid | Moisture % | Lacing | Moisture % | Lacing |
| 0.2 | 0.352 | 1.9 | 0.232 | 1.0 |
| 0.4 | 0.346 | 1.3 | 0.230 | 1.0 |
| 0.6 | 0.319 | 1.3 | 0.227 | 1.0 |

The leached base was used to produce final pigmentary $TiO_2$ with substantially lower moisture content that does not show any tendency to "lace" at any of the organic addition levels.

Example 5

Base was prepared by leaching and washing oxidizer discharge as in example 2. After drying, 0.35% by weight on TiO$_2$ of polydimethylsiloxane was added to the base while tumbling, and the dosed base micronized. The moisture content and lacing are shown below in Table V.

TABLE V

| Moisture Content | Lacing |
|---|---|
| 0.177% | 1.0 |

Comparative Example

Commercial pigments, A, B, C, D and E, which are highly recommended for use in high temperature applications, were tested for alumina level and moisture content. The results are tabled below in Table VI.

TABLE VI

| Sample | Alumina Level | Moisture % |
|---|---|---|
| A | 0.59%[1] | 0.323 |
| B | 1.05%[2] | 0.333 |
| C | 1.0%[2] | 0.349 |
| D | 1.42%[2] | 0.347 |
| E | 1.36%[2] | 0.329 |

[1]Sulfate process pigment
[2]Chloride process pigment

It is seen that the moisture contents of the pigments prepared using leached bases are substantially lower in moisture than the commercial pigments. In fact the bases prepared after leaching, washing, neutralizing, washing and drying (example 2) are all lower in moisture than the commercial pigments even though they have no organic surface treatment.

While the invention has been described in connection with specific embodiments thereof, it will be understood that it is capable of further modifications and this application is intended to cover any variations, uses, or adaptations of the invention following, in general, the principles of the invention and including such departures from the present disclosure as come within known or customary practice within the art to which the invention pertains and as may be applied to the essential features hereinbefore set forth and as follows in the scope of the appended claims.

What is claimed:

1. A method for producing a low volatile pigmentary base, comprising:
    a. oxidizing titanium tetrachloride and aluminum chloride to form an oxidizer discharge comprising co-oxidized alumina and titanium dioxide; and
    b. separating and removing a portion of the co-oxidized alumina, said separating and removing causing a reduction in the ratio of co-oxidized alumina to titanium dioxide, causing a titanium dioxide slurry to be formed, said titanium dioxide slurry comprising said low volatile pigmentary base.

2. A method according to claim 1, wherein said separating is accomplished by leaching.

3. A method according to claim 2, wherein said leaching and removing reduces the amount of co-oxidized alumina by greater than about 0.05% by weight, based on the weight of the titanium dioxide.

4. A method for producing a low volatile pigment comprising:
    a. obtaining an oxidizer discharge, the oxidizer discharge comprising titanium dioxide and co-oxidized alumina;
    b. combining the oxidizer discharge with a solvent;
    c. dissolving a portion of co-oxidized alumina to form dissolved alumina;
    d. removing the dissolved alumina from the titanium dioxide, causing a titanium dioxide slurry to be formed, said titanium dioxide slurry comprising a low volatile pigmentary base; and
    e. drying and micronizing the low volatile pigmentary base to form a low volatile pigment.

5. A method according to claim 4, wherein the solvent is an acid.

6. A method according to claim 5, wherein the acid is sulfuric acid.

7. A method according to claim 4, wherein the solvent is a base.

8. A method according to claim 7, wherein the base is sodium hydroxide.

9. A method according to claim 4, wherein said removing is by filtration.

10. A method according to claim 4, wherein said removing is by decanting.

11. A method according to claim 4 and further comprising neutralizing and washing the titanium dioxide slurry.

12. A method for producing a low volatile pigment comprising:
    a. oxidizing titanium tetrachloride and aluminum chloride to form an oxidizer discharge comprising alumina containing compounds;
    b. removing an amount of said alumina containing compounds greater than 0.05% by weight with respect to the weight of the titanium dioxide to form a low volatile pigmentary base; and
    c. drying and micronizing the low volatile pigmentary base to form a low volatile pigment.

13. A method according to claim 12, further comprising neutralizing and washing said low volatile pigmentary base.

14. A method according to claim 12 and further comprising treating the low volatile pigmentary base with at least one organic compound.

15. A method according to claim 12 and further comprising treating the low volatile pigmentary base with an organic compound selected from the group of polyols, silanes, siloxanes, organophosphorous compounds, amines, fatty acids and esters.

16. A method for obtaining a low volatile pigment according to claim 14, wherein the low volatile pigmentary base is treated with at least two organic compounds comprising a first organic compound and a second organic compound.

17. A method according to claim 16 wherein the first organic surface treatment is added prior to the addition of the second organic surface treatment.

18. A method according to claim 12, further comprising removing said alumina containing compound by dissolving said oxidizer discharge in a solvent to form dissolved alumina and filtering said dissolved alumina.

19. A method for producing a low volatile pigment comprising:
    a. oxidizing titanium tetrachloride and aluminum chloride to form an oxidizer discharge, said oxidizer discharge comprising co-oxidized alumina and titanium dioxide;
    b. combining the oxidizer discharge with a solvent;
    c. dissolving at least 0.05% of the co-oxidized alumina by weight with respect to the titanium dioxide to form dissolved alumina;

d. removing the dissolved alumina from the titanium dioxide, causing a titanium dioxide slurry to be formed, said titanium dioxide slurry comprising titanium dioxide and residual solvent;

e. neutralizing and washing said titanium dioxide slurry and removing the residual solvent;

f. drying said titanium dioxide slurry after said neutralizing and washing, causing a dried pigment to be formed;

g. micronizing said dried pigment to form said low volatile pigment; and h. at a point in the method between having formed the titanium dioxide slurry of step (d) and completion of micronizing of step (g), adding at least one organic surface treatment.

20. A method for preparing a polymer matrix comprising combining the low volatile pigment produced by the method of claim 4 with a polymer.

21. A method for preparing a polymer matrix comprising combining the low volatile pigment produced by the method of claim 12 with a polymer.

22. A method for preparing a polymer matrix comprising combining the low volatile pigment produced by the method of claim 19 with a polymer.

23. A method according to claim 20, wherein said polymer is a polyolefin.

24. A method to claim 21, wherein said polymer is a polyolefin.

25. A method to claim 22, wherein said polymer is a polyolefin.

* * * * *